(12) United States Patent
Keller

(10) Patent No.: US 7,914,446 B2
(45) Date of Patent: Mar. 29, 2011

(54) VIDEO INSPECTION SYSTEM

(75) Inventor: Jeffrey Stanley Keller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1228 days.

(21) Appl. No.: 11/071,665

(22) Filed: Mar. 3, 2005

(65) Prior Publication Data

US 2006/0200001 A1 Sep. 7, 2006

(51) Int. Cl.
*A61B 1/06* (2006.01)

(52) U.S. Cl. ......................................... 600/156; 600/158

(58) Field of Classification Search .................... 348/66; 600/109, 129, 156–158, 163, 170, 182
See application file for complete search history.

(56) References Cited

U.S. PATENT DOCUMENTS

| | | | |
|---|---|---|---|
| 3,903,877 A * | 9/1975 | Terada | 600/157 |
| 5,027,138 A | 6/1991 | Gandrud | |
| 5,169,568 A * | 12/1992 | Ainger, III | 264/1.25 |
| 5,178,536 A | 1/1993 | Werly et al. | |
| 5,386,817 A * | 2/1995 | Jones | 600/104 |
| 5,523,782 A | 6/1996 | Williams | |
| 5,528,432 A * | 6/1996 | Donahoo | 359/894 |
| 5,685,823 A * | 11/1997 | Ito et al. | 600/127 |
| 5,702,249 A | 12/1997 | Cooper | |
| 5,737,013 A | 4/1998 | Williams et al. | |
| 5,745,165 A * | 4/1998 | Atsuta et al. | 348/65 |
| 5,782,751 A * | 7/1998 | Matsuno | 600/157 |
| 5,908,294 A | 6/1999 | Schick et al. | |
| 6,149,300 A | 11/2000 | Greenway et al. | |
| 6,692,432 B1 * | 2/2004 | Yarush et al. | 600/179 |
| 6,726,476 B2 | 4/2004 | Jung et al. | |
| 6,958,766 B2 * | 10/2005 | Cooper | 348/66 |
| 2005/0200842 A1 * | 9/2005 | Bonningue et al. | 356/241.1 |

* cited by examiner

*Primary Examiner* — Philip R Smith
(74) *Attorney, Agent, or Firm* — William Scott Andes, Esq.; Armstrong Teasdale LLP

(57) ABSTRACT

A video inspection system provides capability to view objects not satisfactorily accessible by direct line of sight. The video inspection system includes a fluid ejection nozzle to clear the workpiece area to be inspected, an adjustable focus camera and connections to remote image data processing equipment. The video inspection system includes a sapphire lens cover to protect the optical lens and a tip protection boot to protect the viewing head from damage by contact with the work being inspected.

9 Claims, 3 Drawing Sheets

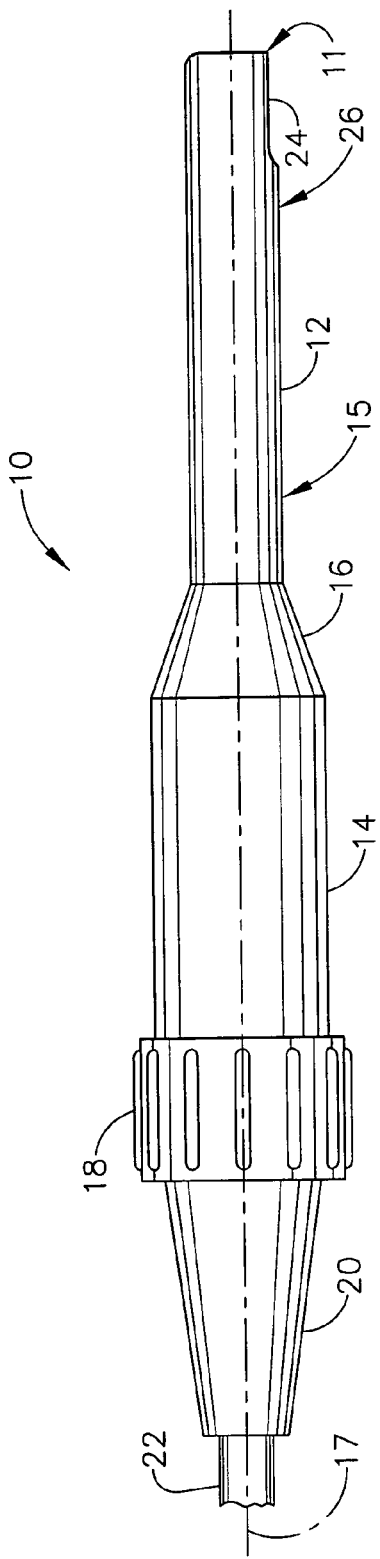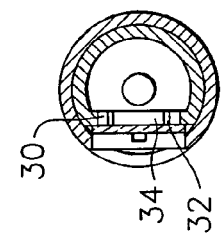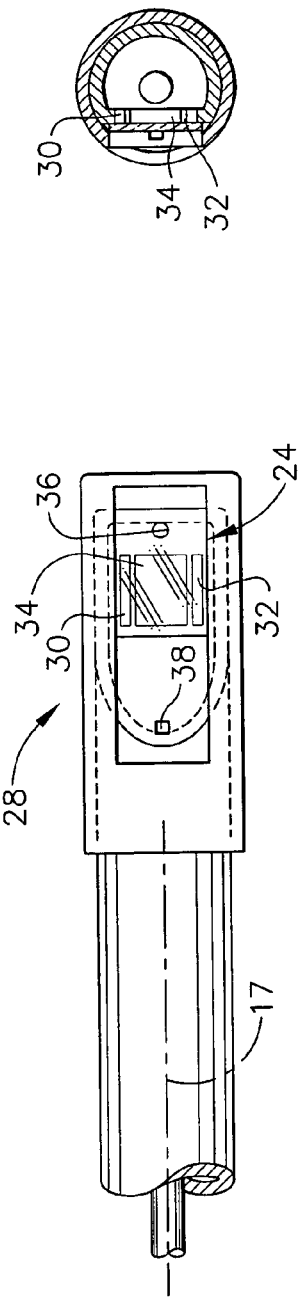

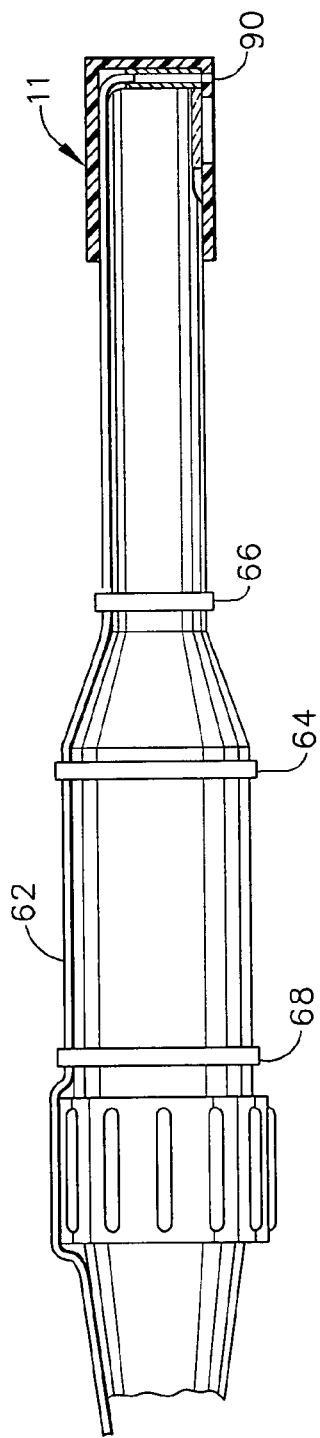
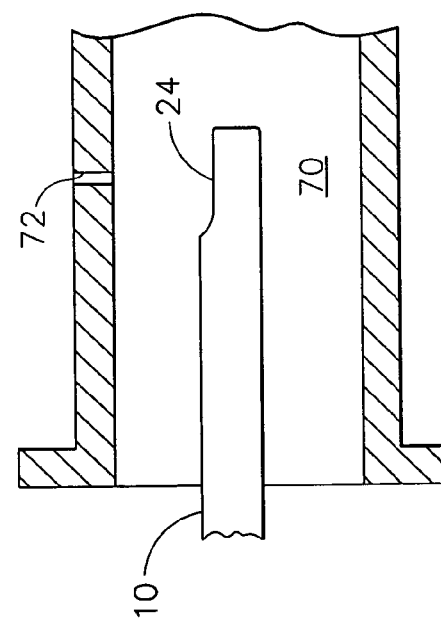

VIDEO INSPECTION SYSTEM

BACKGROUND OF THE INVENTION

This invention relates generally to video inspection apparatus, and, in particular, to an apparatus for remote visual inspection of objects not accessible by direct line of sight, for example, objects internal to machinery.

Thorough inspection of industrial equipment, such as turbomachinery components, requires examination of features and surfaces to which there is no direct line of sight or only a poor line of sight. Many of these features and surfaces are highly-stressed, such as internal oil drain holes, compressor spool inner cavities, and retaining hooks. The part geometries and surface inspections for specified coatings, shotpeen coverage and fluorescent penetrant inspection included in drawing requirements are crucial to component performance and/or life. The area to be inspected may be difficult to illuminate or may be contaminated by debris or dust from a manufacturing, surface finishing or other process. Inspection of remote cavities is often needed, and these cavities often trap machining chips, grinding grit, oils, coolants, or other debris created during manufacturing or finishing processes.

BRIEF DESCRIPTION OF THE INVENTION

The video inspection system includes an optical viewing apparatus which can be positioned to provide video imagery of locations which are visually inaccessible or only partially or poorly accessible. The optical viewing apparatus includes a mechanism for delivery of pressurized fluid to clear the workpiece area to be inspected, a light source to illuminate the area and a video camera to capture optical images, convert the images to digital data and provide image data to electronic image data processing equipment. The camera is supported by an adjustable mount within the apparatus to allow adjustment of the camera focus on the workpiece site to be inspected. The optical viewing apparatus has a head which includes a viewing aperture and protective coverings to make the apparatus robust enough to survive wear and tear from normal use. A fluid spray feature may be included for clearing the surface of the viewing aperture.

BRIEF DESCRIPTION OF THE DRAWINGS

FIG. 1 is a schematic illustration of one embodiment of a video inspection system of the present invention;

FIG. 2 is a partial schematic view of the viewing head of the system shown in FIG. 1;

FIG. 3 is a schematic cross-sectional view of the viewing head shown in FIG. 2;

FIG. 6 is a schematic view showing another alternative embodiment of the invention; and FIG. 7 is a schematic showing of one example of an embodiment of an inspection system in use.

DETAILED DESCRIPTION OF THE INVENTION

Figure 4:
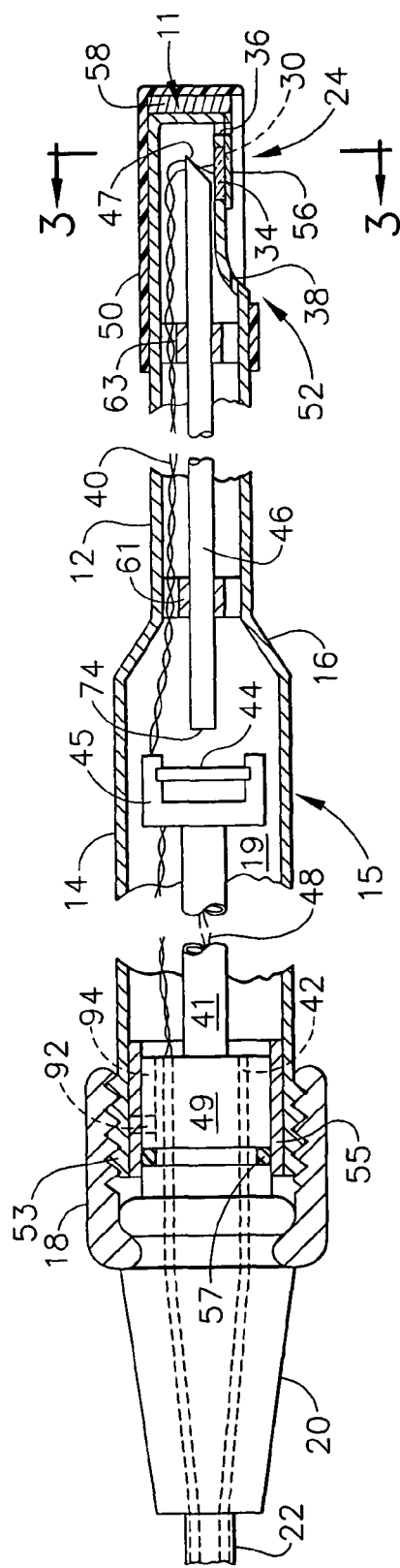
FIG. 4 is a schematic cross-sectional view of the video inspection system shown in FIG. 1.

One exemplary embodiment of a video inspection system is shown schematically in FIG. 1. The video inspection system 10 includes a first hollow generally cylindrical, elongated tube 12 of a first diameter, a second hollow generally cylindrical, elongated tube 14 having a second diameter larger than the diameter of tube 12, and a hollow generally frusto-conical tube 16 connected at respective ends thereof to tubes 12 and 14 in coaxial alignment about axis 17 to form a closed tool body 15 of metal or other suitable material. A rotatable collar 18 is threaded to tube 14 and is connected to frusto-conical sleeve 20 which is connected to hollow, cylindrical sleeve 22. At one end 11 of tube 12 is an viewing aperture 24 through the cylindrical sidewall 26. The use of a small diameter tube 12 and larger diameter tube 14 are selected to facilitate insertion through small openings into inspection sites and convenient handling by the operator. Other tube diameters may be selected, for example identical diameter tubes may be selected to eliminate the need for frusto-conical tube 16.

As shown in FIGS. 2 and 3 viewing head 28 includes viewing aperture 24, a light source, such as first illumination aperture 30 and second illumination aperture 32, and optical lens 34. A first fluid ejection nozzle 36 is located adjacent the optical lens 34 to direct fluid outward from said tool body toward a workpiece site to be inspected, and second fluid ejection nozzle 38 passes through sidewall 26 in a direction generally aligned with axis 17, and is located adjacent the viewing aperture 24 to eject fluid generally parallel to axis 17 and along the surface of optical lens 34.

As shown in the FIG. 4 cross section, optical fibers 40 provide a light source to the illumination apertures 30, 32 to emit light toward an object in optical alignment with the optical lens 34. A fluid supply tube 42 extends through sleeve 22 and connects a gas source (not illustrated) to the interior plenum chamber 19 of the tool body 15 and to fluid ejection nozzles 36 and 38. A light tube 46 is mounted within tool body 15 and is held in fixed axial position relative to cylindrical sidewall 26 within elongated tube 12 by spiders 61, 63 to orient angled surface 47 in optical alignment with optical lens 34 to facilitate capture of images of the object to be inspected. A miniature digital camera 44 is mounted in optical alignment with one end 74 of light tube 46 within the tube 12 on camera mount 45, which is supported by tube 41 and base 49 mounted within sleeve 55 in fixed position relative to frusto-conical sleeve 20. Base 49 and sleeve 55 are sealed by O-ring 57 to allow relative movement between base 49 and sleeve 55 but prevent leakage of fluid into or out of plenum chamber 19. The tube 14 and rotatable collar 18 are connected by thread 53. Light tube 46 is adjustable axially by rotation of collar 18, which moves the elongated tube 12 and light tube 46 axially relative to base 49 and camera 44 to position the end 74 of light tube 46 relative to camera 44. A translucent boot 50 of rubber or some other suitable material is fitted over the end 11 of tube 12 with cut-out window 52 aligned with port 24. A sapphire lens cover 56 and mounting strap 58 are secured to end 11 of tube 12 by translucent boot 50. The translucent boot 50 encloses cover 56 and mounting strap 58 and protects the viewing head 28 from abrasion or other damage.

When in use the tool body 15 is positioned by the operator so that viewing aperture 24 is located adjacent to components of a workpiece to be examined. The camera is activated to capture video or still images. The focus of camera 44 may be adjusted by rotation of collar 18 relative to tube 14, which moves base 49 and camera 44 axially within tube 14 toward or away from the end 74 of light tube 46. The base 49 is maintained in alignment with axis 17 by pin 92 attached to sleeve 55 and slot 94 in base 49. This allows precise focus of the camera upon the workpiece surface to be inspected. Images of the workpiece are transmitted by light tube 46 to camera 44, which translates the images into digital image data and transmits the image data via data cable 48 through tool body 15 to external image processing equipment (not illustrated) for display, storage, image enhancement or other processing at the option of the operator.

During use of the video viewing apparatus of FIG. 4, a gas may be supplied via fluid supply tube 42 to pressurize the plenum chamber 19 to provide a gas stream to first fluid ejection nozzle 36 to clear the workpiece site to be viewed and to simultaneously supply another gas stream to second fluid ejection nozzle 38 to clear dust or other material from the optical lens 34. The gas may be air or inert gas or another gas compatible with the workpiece site to be examined. The gas may be provided in a single blast or a plurality of blasts prior to, or simultaneously with, optical examination of the workpiece site.

Figure 5:
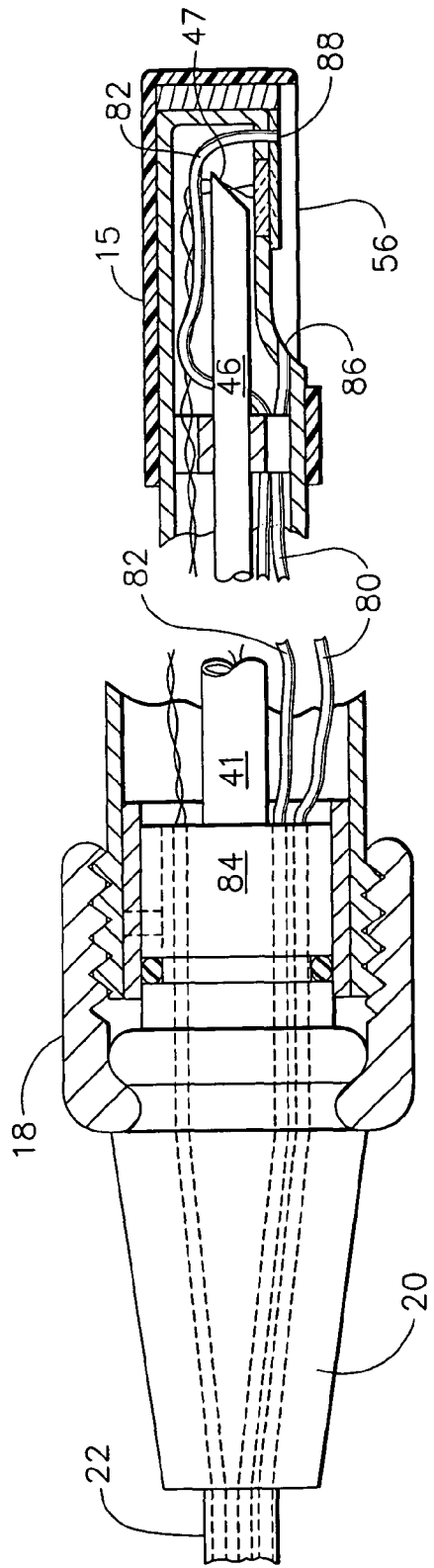
FIG. 5 is a schematic cross-sectional view showing an alternative embodiment of the invention.

FIG. 5 schematically illustrates an alternative embodiment of the video inspection system. The tool body 15 is the same as in the embodiment of FIG. 4. A first fluid supply tube 82 passes through base 84 and is connected to a fluid supply (not shown) separate from the fluid supply source connected to tube 82 and is connected in flow communication with first fluid ejection nozzle 88. A controlled flow of fluid is supplied via first fluid supply tube 82 to first fluid ejection nozzle 88 which fluid may be air, inert gas or another gas, or may be water or other liquid, such water having a detergent or other solvent. The operator may activate the flow to nozzle 88 to remove debris, oil, dust or other contaminants from the workpiece area to be viewed. A second fluid supply tube 80 passes through base 84 and is connected to a fluid supply (not shown) and is connected in flow communication with second fluid ejection nozzle 86. The operator may activate the flow through tube 80 to spray fluid, such as air, inert gas, some other gas, or a liquid, such as water or other liquid including detergent or other solvent to remove debris, dust or other contaminants from the optical lens 34 to ensure a clear view. The other components are as shown in FIG. 4. The FIG. 5 arrangement using separate sources of fluid for the lens spray and the workpiece spray allows the operator to control fluid ejection to clear the workpiece area to be inspected separately from fluid ejection to clear the lens. The operator may select the type of fluid and the number and sequence of steps to spray gas or liquid to clear optical lens 34. The operator may also select the gas or liquid to be used to clear the workpiece based on the material of the workpiece and of the contaminant to be cleared, which may or may not be identical to the fluid used to clear the workpiece site to be inspected.

FIG. 6 shows schematically an optical inspection system using an external fluid supply tube 62 for supplying gas or liquid to orifice 90 at the end 11 of the tube 12 to clear the workpiece site to be inspected. The tube 62 is secured to the exterior of the optical viewing apparatus by bands 64, 66 and 68, and boot 50 at the end 11 of the tube 12. The optical viewing system configuration using the interior plenum chamber 19 configuration of FIG. 4 with gas blast may be used with external tube 62 to supply supplemental gas or may be used with liquid to clear the workpiece viewing area. This allows the operator to selectively apply a solvent or other cleaning material compatible with the workpiece via external fluid supply tube 62 to a site to be viewed. Alternatively, the optical viewing system configuration shown in FIG. 5 may use the external tube 62 to provide supplemental site clearing with either gas or liquid. The first fluid supply tube 82 may supply the same fluid as external fluid supply tube 62 or may supply a different fluid simultaneously or separately as needed to clear the workpiece viewing area. This allows the operator to select the fluid to properly clear the area without affecting the internal components of the optical viewing apparatus.

In use, as shown in FIG. 7, the optical viewing system 10 is manually inserted into an aperture 70 to provide access for inspection. The light source is activated to illuminate the area to be inspected, shown as drain hole 72. Air, inert gas or other suitable gas, or liquid solvent, detergent or other liquid compatible with the material of the workpiece is ejected from the first fluid ejection nozzle 36 and/or nozzle 90 to blow dust, debris or other contaminants from the viewing area. Image data are transmitted from the camera to electronic display systems to store, display, or process the images. The electronic display system typically is used to enlarge, rotate, reverse or otherwise manipulate the image for clear evaluation by the operator. The image may also be stored electronically for immediate or subsequent comparison to a standard image or other images of the same area at separate points in the manufacturing or assembly process of the item being inspected.

While the invention has been described in terms of various specific embodiments, those skilled in the art will recognize that the invention can be practiced with modification within the spirit and scope of the claims.

What is claimed is:

1. A video inspection system comprising:
   an elongated, hollow tool body generally cylindrical about a longitudinal axis;
   a viewing head comprising a viewing aperture through said tool body, said viewing head comprising an optical lens disposed at an axial end of said tool body;
   at least one illumination aperture disposed adjacent said viewing aperture for illuminating a workpiece site to be inspected;
   an interior plenum chamber sealed by a seal ring between a base member and a sleeve member of the tool body, said seal permits relative movement between the base and the sleeve while substantially preventing leakage of a fluid into or out of the plenum chamber;
   a fluid supply tube coupled in flow communication between a fluid source and the plenum chamber;
   a first fluid ejection nozzle disposed adjacent said viewing aperture to direct fluid received from the plenum chamber generally radially outward from said tool body;
   a digital camera disposed within said tool body and supported by a camera mount such that said digital camera is axially movable within said tool body;
   a light tube disposed within said tool body, said light tube comprising a first end in optical alignment with said optical lens and a second end in optical alignment with said digital camera; and
   a data cable connected to said digital camera for transmitting data from said digital camera to external image data processing equipment.

2. The video inspection system of claim 1, further comprising:
   a second fluid ejection nozzle disposed in said tool body to emit fluid over said viewing aperture.

3. The video inspection system of claim 2, further comprising:
   a sapphire lens cover covering said optical lens.

4. The video inspection system of claim 3, wherein said tool body encloses a plenum chamber in flow communication with said first fluid ejection nozzle and said second fluid ejection nozzle.

5. The video inspection system of claim 4, further comprising:

a fluid supply tube disposed external to said tool body and connected in flow communication with a fluid source and a third fluid ejection nozzle disposed adjacent said viewing aperture.

6. A video inspection system comprising:

a tool body comprising in axial alignment about a common axis: a first elongated, hollow generally cylindrical tube having a viewing head disposed at one end thereof and connected at the second end thereof to a first axial end of a first hollow generally frusto-conical tube connected at the opposite axial end thereof to one end of a second elongated, hollow generally cylindrical tube having a rotatable collar attached at the opposite end thereof to a second hollow generally frusto-conical sleeve to form a closed plenum chamber within said tool body;

said viewing head comprising:
- a viewing aperture through the cylindrical side wall of said first elongated, hollow generally cylindrical tube enclosing an optical lens;
- at least one illumination aperture adjacent to said viewing aperture; and
- a sapphire lens cover covering said optical lens;
- a translucent protective cylindrical boot closed at one axial end and mounted axially onto said end, said first cylindrical tube having a cut-out window in alignment with said viewing aperture;
- a digital camera disposed within said tool body;
- an adjustable camera mount disposed within said tool body to support said camera;
- an elongated, generally cylindrical light tube including a surface at one end thereof aligned with said optical lens and a second end of said light tube optically aligned with said camera;
- a fluid supply tube for providing pressurized gas to said plenum chamber;
- a first fluid ejection nozzle through said boot adjacent said sapphire lens cover; and
- a data cable connected to said camera and extending through a hollow cylindrical sleeve connected to said frusto-conical sleeve for providing image data from said camera to external image processing equipment.

7. The video inspection system of claim 6, wherein:

said rotatable collar is threaded to said second elongated, hollow cylindrical tube to move said first elongated, hollow cylindrical tube axially to focus the image emitted by said light tube onto said camera.

8. The video inspection system of claim 7, further comprising:

a second fluid ejection nozzle adjacent said viewing aperture for directing gas flow from said plenum chamber over said sapphire lens cover.

9. The video inspection system of claim 8, further comprising:

a fluid supply tube disposed external to said tool body and connected to a fluid ejection nozzle oriented to spray fluid from said fluid supply tube onto a workpiece site to be examined.

* * * * *